United States Patent
Blaffert et al.

(10) Patent No.: US 7,636,484 B2
(45) Date of Patent: Dec. 22, 2009

(54) METHOD FOR THE SELECTIVE RENDERING OF BODY STRUCTURES

(75) Inventors: Thomas Blaffert, Hamburg (DE); Rafael Wiemker, Kisdorf (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 935 days.

(21) Appl. No.: 10/533,648

(22) PCT Filed: Nov. 12, 2003

(86) PCT No.: PCT/IB03/05090

§ 371 (c)(1),
(2), (4) Date: May 5, 2005

(87) PCT Pub. No.: WO2004/047023

PCT Pub. Date: Jun. 3, 2004

(65) Prior Publication Data

US 2006/0045370 A1 Mar. 2, 2006

(30) Foreign Application Priority Data

Nov. 15, 2002 (DE) .................................. 102 53 191

(51) Int. Cl.
G06K 9/40 (2006.01)
G06K 9/00 (2006.01)
G06K 9/70 (2006.01)
G06K 9/44 (2006.01)
G06T 5/00 (2006.01)

(52) U.S. Cl. ........................ 382/254; 382/128; 382/226; 382/257

(58) Field of Classification Search .................. 382/128, 382/254, 257
See application file for complete search history.

(56) References Cited

U.S. PATENT DOCUMENTS

| 4,097,845 | A | * | 6/1978 | Bacus | 382/134 |
| 5,555,352 | A | * | 9/1996 | Lucas | 345/423 |
| 5,577,131 | A | | 11/1996 | Oddou | |
| 5,588,071 | A | | 12/1996 | Schultz | |
| 5,832,134 | A | | 11/1998 | Avinash et al. | |
| 5,867,605 | A | | 2/1999 | Oliveras et al. | |
| 5,892,841 | A | | 4/1999 | Jochems et al. | |
| 6,396,939 | B1 | * | 5/2002 | Hu et al. | 382/128 |
| 6,832,002 | B2 | * | 12/2004 | Baatz et al. | 382/173 |
| 2001/0055421 | A1 | | 12/2001 | Baatz et al. | |
| 2002/0009215 | A1 | | 1/2002 | Armato et al. | |
| 2002/0191827 | A1 | * | 12/2002 | Armato et al. | 382/131 |

OTHER PUBLICATIONS

Beucher, "The Watershed Transformation Applied to Image Segmentation", Scanning Microscopy International, V. 6, 1991, pp. 299-314.*
Haris, K., et al.; Hybrid Image Segmentation Using Watersheds and Fast Region Merging; IEEE Trans. on Image Proc.; 1998; 7:12:1684-1699.

(Continued)

*Primary Examiner*—Andrew W Johns
*Assistant Examiner*—Jose M Torres

(57) ABSTRACT

A method provided for the formation of a selective rendering of body structures of an object to be examined from a primary image data set. The method provides a simple and fast selection or deselection of given body structures. The method comprises the following steps: forming at least one pixel group (BG1-BG16) which comprises pixels from the primary data set which are in conformity with predetermined filter criteria, forming at least one pixel list by selection and/or deselection of at least one pixel group in conformity with predetermined criteria, marking the pixels of the pixel groups of the at least one pixel list, forming a filtered secondary image data set which includes the marked pixels, and forming the rendering from the secondary image data set, the marked pixels being separately rendered in highlighted or suppressed form.

18 Claims, 6 Drawing Sheets

OTHER PUBLICATIONS

Figure 1:
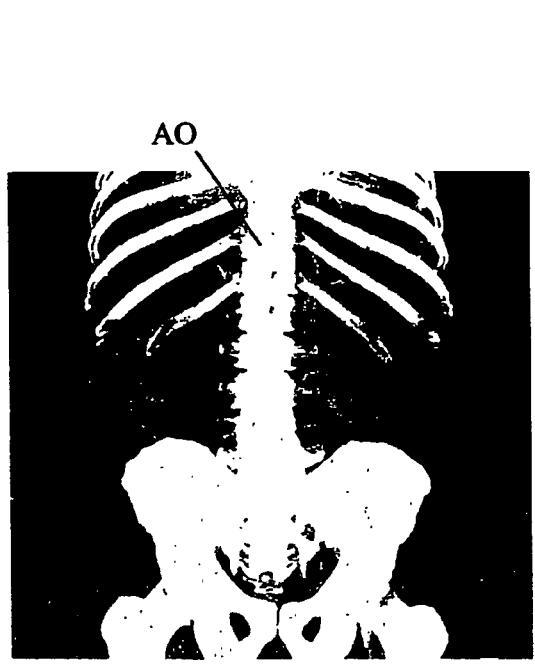

Salembier, P., et al.; Hierarchical Morphological Segmentation for Image Sequence Coding; IEEE Trans. on Image Proc.; 1994; 3:5:639-651.

Vincent, L., et al.; Watersheds in Digital Spaces: An Efficient Algorithm Based on Immersion Simulations; IEEE Trans. on Pattern Analysis; 1991; 13:6:583-598.

* cited by examiner

METHOD FOR THE SELECTIVE RENDERING OF BODY STRUCTURES

The invention relates to a method for the formation of a selective rendering of body structures of an object to be examined from a primary image data set, notably a primary image data set acquired by means of computed tomography, magnetic resonance tomography or another tomographic imaging method.

Methods of the kind set forth are known. They are applied notably in the field of medical diagnostics so as to extract from an image data set a simplified and reduced rendering in which structures which are not essential for the evaluation are suppressed or rendered in attenuated form. For example, U.S. Pat. No. 5,832,134 discloses a method in which the pixels are classified, in conformity with a predetermined image value threshold, as pixels to be visualized and pixels which are not to be visualized. These types of methods are suitable notably when pixels below or above a given image value are not required for the evaluation of the image. Furthermore, selective rendering methods are known in which pixels that belong to image structures smaller or larger than a predetermined image structure size are not visualized or visualized exclusively. For example, the search for notably small structures in an image can thus be facilitated.

In addition to the described rendering methods, in which automatic selection of given pixels takes place in conformity with predetermined criteria, rendering methods are known in which a user can perform a preselection of body structures to be rendered or not by marking given image areas. For example, it is known to select, by manual definition of a boundary curve around a body structure, the pixels of this body structure so as to highlight or suppress such pixels. It often occurs that the frequently present filigree nature of the body structures cannot be taken into account to an adequate extent, so that such manual filtering methods are suitable only for forming a selective rendering in a simplified and coarse manner.

Considering the increasingly greater information contents and the increasingly higher resolution of images to be evaluated, for example, medical slice images, dedicated selection of the relevant information from such images is of major importance. The known methods cannot satisfy this requirement, notably not when filtering is performed with simple criteria Therefore, it is an object of the invention to provide a method for the formation of a selective rendering of body structures in which a faster and more selective selection of the pixels can be achieved in comparison with the known methods.

This object is achieved in accordance with the invention by means of a method of the kind set forth which comprises the steps of:

combining a plurality of pixels so as to form at least one pixel group which comprises each time pixels which are associated with the pixel group in conformity with predetermined filter criteria, forming at least one pixel list by selection and/or deselection of at least one pixel group, forming a filtered secondary image data set in which the pixels of the pixel groups of the at least one pixel list formed are marked, and forming the rendering from the secondary image data set, the marked pixels being rendered separately, notably in highlighted or suppressed form.

The pixels in the pixel group can then be combined in the form of an enumeration list which contains, for example, a reference to the individual, combined pixels or which comprises the pixel data itself, that is, usually the co-ordinates and the image value of the pixel. In particular known filter methods can be used as predetermined filter criteria for such combining, for example, filtering by means of limit values for the image value, filtering by means of region growing, filtering by means of morphological aperture, filtering by means of watershed transformation, filtering by means of distance values of the pixels, determined in advance in a distance transformation, or combinations of such filter methods. Filter methods of this kind are known and can be derived, for example, from the publication "Digital Image Processing", Rafael C. Gonzales and Richard E. Woods, Addison-Wesley, 2002.

For the formation of the pixel list automatic selection and deselection of the pixel groups can be performed in conformity with predetermined criteria, but in particular manual selection and deselection of the individual pixel groups by the user of the method are also possible. In this context the term selection is to be understood to mean the selection of a pixel group or the inclusion of a pixel group in a previously made selection. In this context the term deselection is to be understood to mean the removal of a pixel group from a previously made selection or the marking of the pixels of the pixel group as pixels which are explicitly not to be included in a selection made.

The pixel list can be formed as an enumeration list which contains a reference to the selected and deselected pixel groups. The pixel list may also be formed as an enumeration list which comprises all pixels selected by selection and deselection, that is, notably their image co-ordinates and image values, or comprises a reference to the corresponding pixels. In this case the pixel list is formed by taking up all pixels of the selected pixel groups in the enumeration list and by removing all previously taken up pixels of the pixel list from the enumeration list again if they belong to a deselected pixel group.

Preferably, the pixels in the secondary image data set are marked by setting the image value of these pixels to a predetermined, uniform image value, for example, the value 0. As a result, the pixels contained in the pixel list are suppressed. Furthermore, the pixels can be marked by reducing their image value by a predetermined absolute or relative amount. The pixels contained in the pixel list can then be represented in attenuated form in the subsequently formed rendering from the secondary image data set. Furthermore, the pixels contained in the pixel list can be marked in such a manner that they are highlighted or diminished in color in the subsequent rendering.

The formation of the rendering from the secondary image data set is preferably performed by means of known methods such as, for example, the maximum intensity projection. The highlighting or suppression of the marked pixels can be realized by rendering these pixels in color or by contrast-enhanced or contrast-reduced rendering of these pixels in relation to the pixels not contained in the pixel list.

According to a first advantageous version of the invention the pixel groups initially overlap at least partly. As a result, individual regions of a previously selected pixel group can be cut out by deselection of pixel groups so that the relevant pixels are excluded from the separate rendering.

The method in accordance with the invention can be extended notably by forming a combination data tree in which each pixel group is associated with a node, the nodes being logically associated with one another in conformity with a predetermined combination criterion and the selection and deselection being performed by selection and/or deselection of the nodes. The combination data tree facilitates the automatic and notably the manual selection and deselection of the nodes in such a manner that image regions which are not coherent or pixel groups which partly overlap can be selected or deselected for the formation of the pixel list by selecting a first node and by selecting or deselecting a second node which is associated with a different, possibly partly overlapping pixel group. It can notably be arranged that a first pixel group is associated with a first node and this first pixel group is subdivided into a plurality of subordinate pixel groups which contain pixels which are also contained each time in the first pixel group and are associated with the subordinate nodes. Selection of the first node and deselection of individual subordinate nodes then enables easy formation of a pixel list which contains all pixels of the first pixel group with the exception of the pixels of the deselected pixel groups.

The described advantageous extension of the method can be further elaborated when the logic combination of two nodes takes place when at least one of the conditions in conformity with claim 4 is satisfied. As a result of this type of logic combination, a structure is obtained for the combination data tree which can be particularly simply understood and facilitates the formation of the pixel list by manual selection and deselection by a user. Furthermore, because of this type of logic combination it is particularly simply achieved that given pixels of a predetermined pixel value range are rendered separately by selection and deselection of the pixel groups.

It is particularly advantageous to combine nodes of pixel groups which are situated less than a predetermined distance from one another so as to form higher-ranking nodes. The combining of the pixels thus becomes transparent and clear. In this context the distance between two pixel groups can be defined as the smallest distance between the edges of the body structures formed by the pixel groups. It would alternatively be possible to define this distance as the distance between the centers of the body structures formed by the pixel groups.

In a further advantageous version of the method in accordance with the invention the logic combination is performed by mutual combination of pixel groups in the form of a hierarchically structured combination tree by executing the steps disclosed in claim 5. The formation of a hierarchically structured combination tree with a plurality of hierarchical levels and the combination of the nodes in the described manner is particularly suitable for carrying out automatic or manual selection of the individual nodes.

The above method can be advantageously further elaborated by forming the filtered secondary image data set by selection and deselection of nodes of different levels. Preferably, a selection/deselection of the nodes can be performed in a hierarchically descending fashion, meaning that the nodes of higher-ranking levels are selected/deselected before nodes of the level situated therebelow are selected/deselected. This enables the formation of a pixel list which enables separate rendering of pixels and also enables a refinement of the selective rendering because the selection/deselection extends to lower hierarchical levels, that is, down to a given hierarchical level. In dependence on the calculation time, that is, in the case of automatic formation of the pixel list, or in dependence on the processing time spent by the user, that is, in the case of manual formation of the pixel list, the pixel list can thus be refined to a given degree because the selection/deselection extends to a given hierarchical level.

In a further advantageous version of the method in accordance with the invention the combination of the pixels into the at least one pixel group is performed by means of the watershed transformation in conformity with the steps of the method disclosed in claim 7. A description of the filtering by means of watershed transformation can be derived from the publication "Watersheds in Digital Spaces: An Algorithm Based on Immersion Simulations", L. Vincent and P. Soille, IEEE Trans Pattern Anal. Machine Intell., Vol. 13, 6, June 1991, pp. 583-598.

The combination of the pixels by means of the filter criterion of the watershed transformation enables the formation of pixel groups without prior indication of starting elements (seed points). In the case of filtering by means of region growth, however, it would be necessary to determine one or more starting points; this operation is often performed manually and requires an additional effort.

During the formation of the gradient image data set functionally a first derivation of the gradient image values over the space co-ordinates of the pixels is carried out. This means that each pixel is assigned a gradient image value whose amount represents the amount by which the image value of the pixel deviates from that of the neighboring pixels. Thus, regions in which adjacent pixels whose image values do not deviate or deviate only slightly from one another are situated are characterized by small gradient image values and in a topographical rendering, in which the gradient image value over two space co-ordinates is mapped, they represent flat regions. In regions in which the image value of neighboring pixels deviates by a large amount, local maxima in the topographical rendering constitute elevated region components. These local maxima can be understood as "dams" which separate regions that are lower from one another. When the pixels situated in the flat regions are combined, that is, in the case of "flooding" of the regions surrounded by the dams, speaking in terms of the present model, pixels with increasing gradient image values are combined so as to form a pixel group, starting from local minima of the topographic rendering, until a dam is reached as a boundary of a region.

Depending on how pronounced a maximum must be so as to be regarded as a boundary of an image region, that is, as a dam, less pronounced maxima may also be exceeded. Thus, in successive combination steps with filter criteria which are coarse initially, that is, image region boundaries defined by pronounced maxima, and become more refined during the sub-sequent combination steps, pixel groups can be formed which contain large structures and are step-wise segmented in subordinate hierarchical levels.

On the one hand, starting from a large pixel group a further refinement can then be carried out and this pixel group can be subdivided into a plurality of smaller pixel groups, that is, to proceed from the large pixel group towards smaller pixel groups. Alternatively, a plurality of pixel groups which have been determined by means of a very finely discriminating filter method can also be combined at a later stage so as to form higher-ranking, larger pixel groups.

The method in accordance with the invention, involving the formation of a combination data tree, can be advantageously further elaborated by forming a plurality of hierarchically structured combination data trees by means of the steps disclosed in claim 8. For the formation of the pixel list the formation of a plurality of combination trees enables selection and deselection to be performed for pixel groups whose pixels were combined in accordance with different filter criteria. This enables a more extensive, differentiated formation of the pixel list.

For example, it is possible to form a first combination tree whose nodes represent pixel groups which contain pixels combined in conformity with the region growing filter criterion, and also a second combination data tree whose nodes represent pixel groups whose pixels were combined in conformity with the watershed transformation filter criterion.

During a subsequent automatic or manual selection and deselection of the nodes, nodes can be selected and/or deselected in the first as well as in the second combination data tree, thus forming the pixel list. In this manner it is possible to include in the pixel list those image regions which have to be rendered separately and which can be rendered particularly well by means of a given filter criterion.

A further aspect of the invention concerns a device which comprises means for carrying out said steps of the method and also a computer program with program means for carrying out said steps of the method.

The invention provides a method, a device and a computer program which enable simplified and fast formation of a selective rendering of body structures of an object to be examined in that pixels which are to be separately rendered in the rendering, that is, notably highlighted or suppressed, can be combined and marked in a simple manner. Notably in the field of medical image processing the invention enables the suppression of body structures which are not relevant for the diagnosis. For example, in computed tomography angiography images the bone structures can be suppressed so as to obtain a data-reduced image which can be more simply evaluated than an overall image that has not been reduced.

In another embodiment, a computer executes a computer program comprising instructions stored on computer memory of the computer and when executed on the computer, cause the computer to perform the method described herein.

Figure 2:
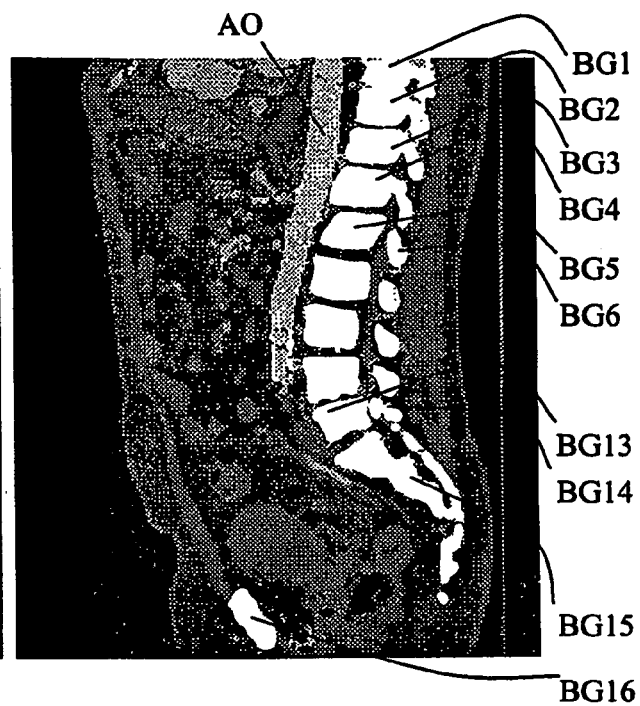
Figure 3:
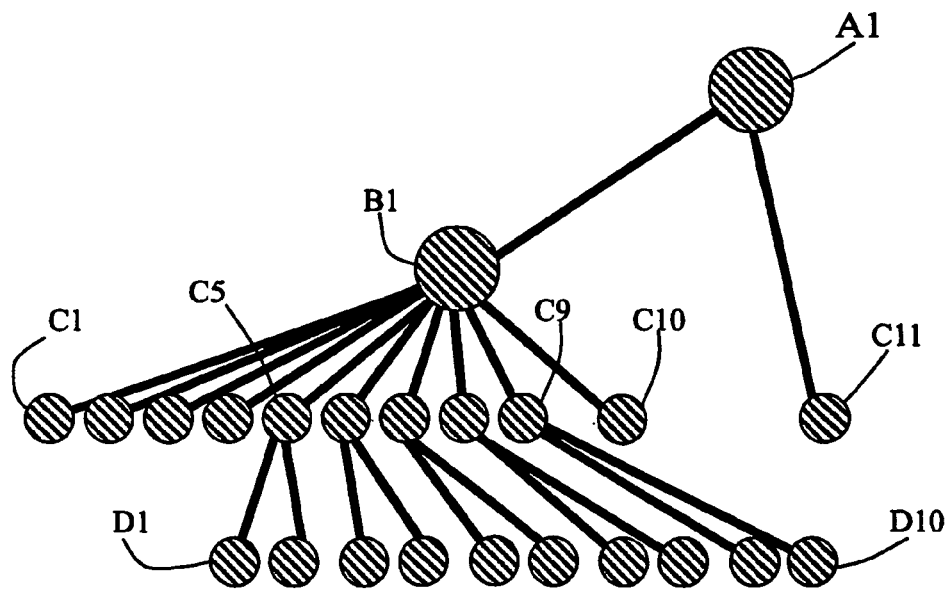
Figure 4:
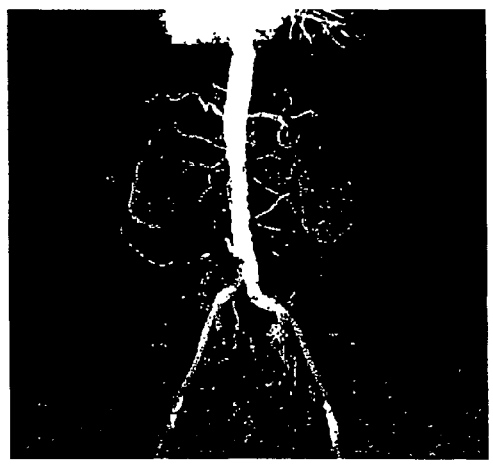
Figure 5:
Figure 6:
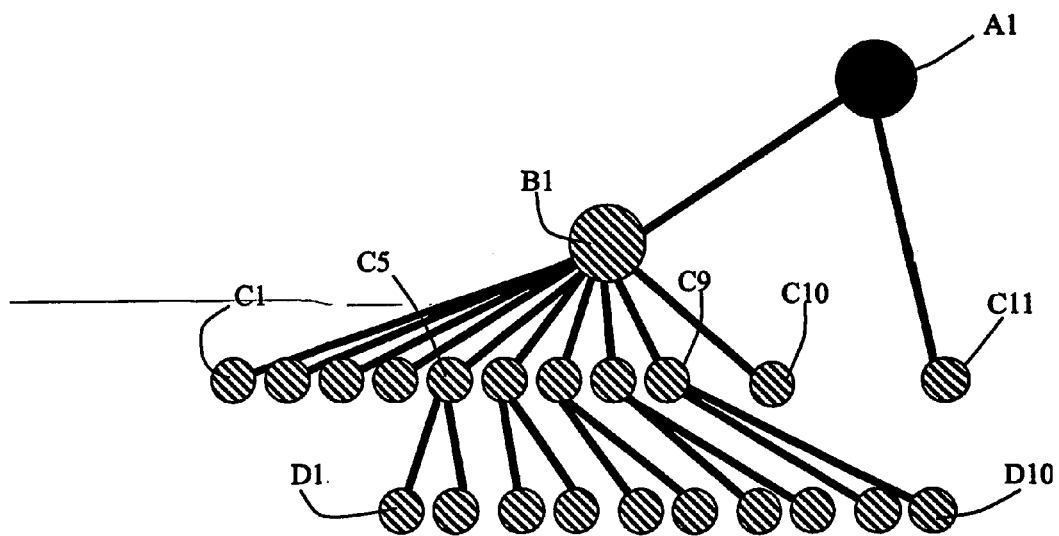
Figure 7:
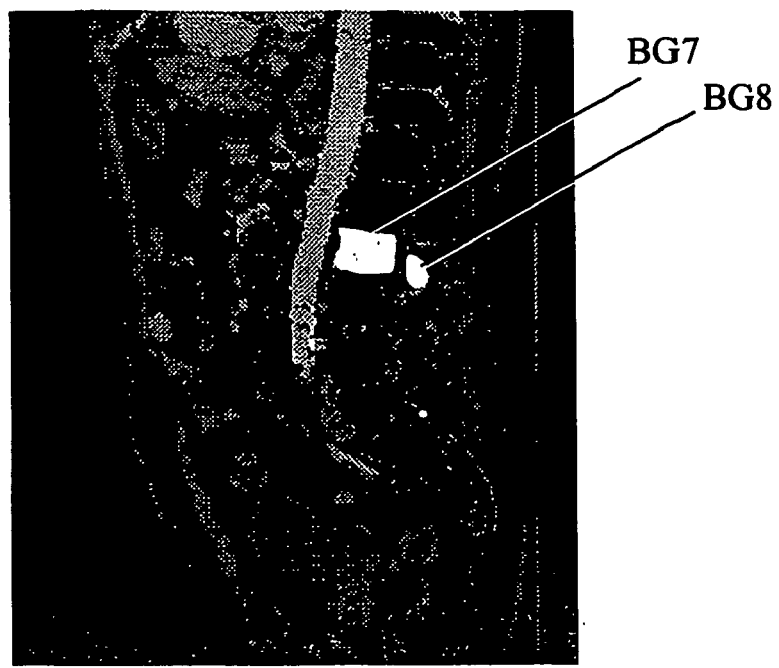
Figure 8:
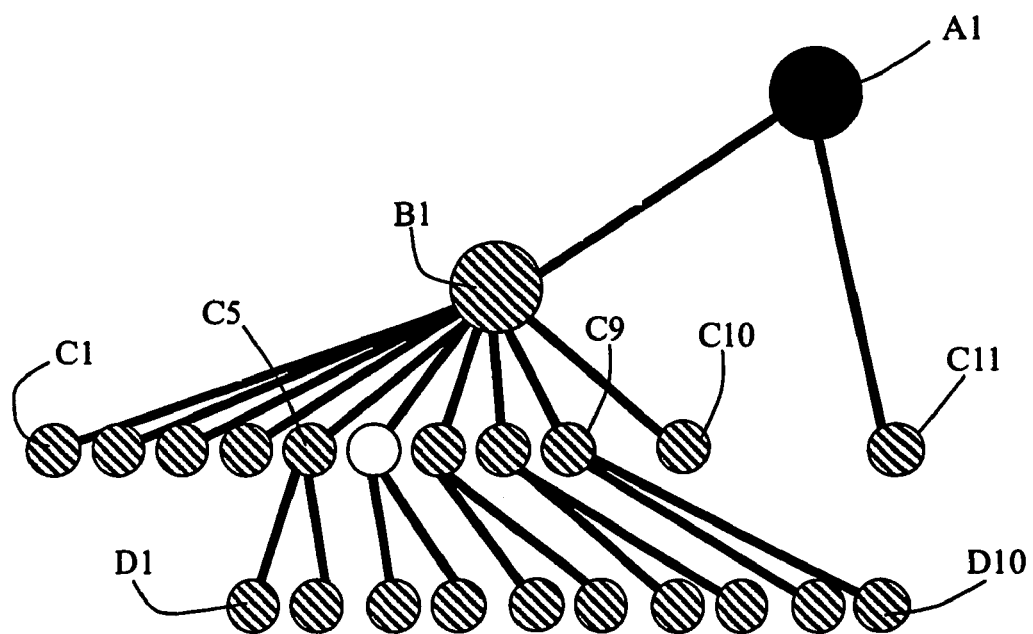
Figure 9:
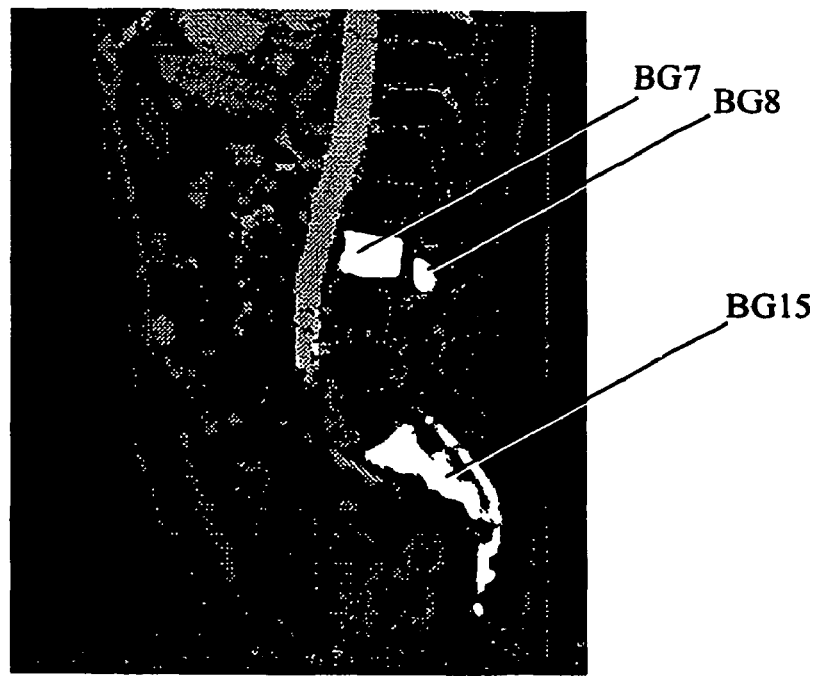
Figure 10:
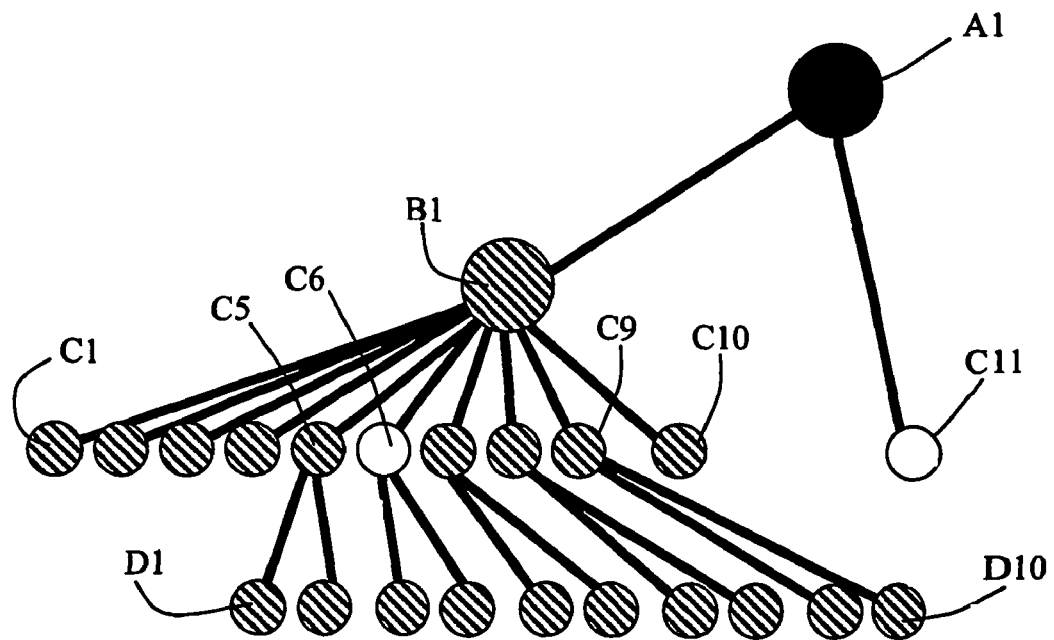
Figure 11:
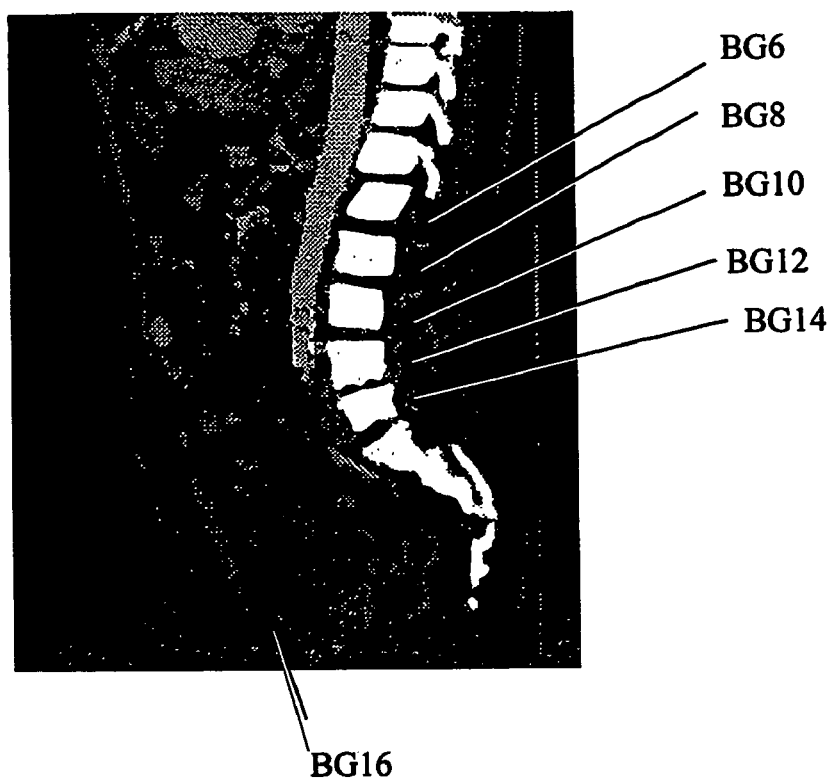
Figure 12:
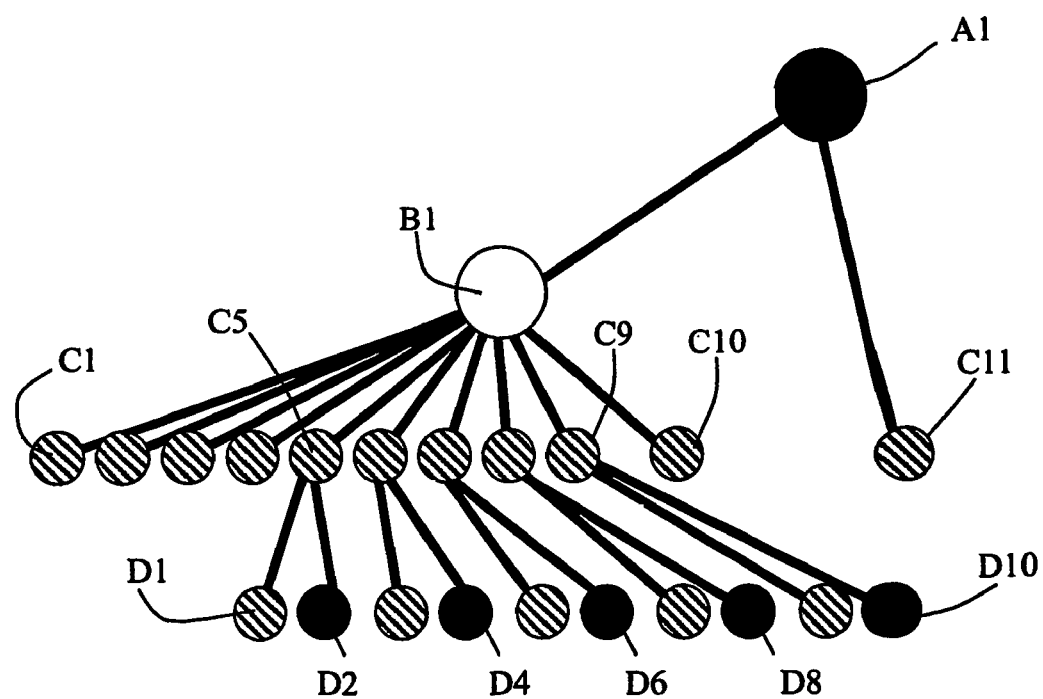
Figure 13:
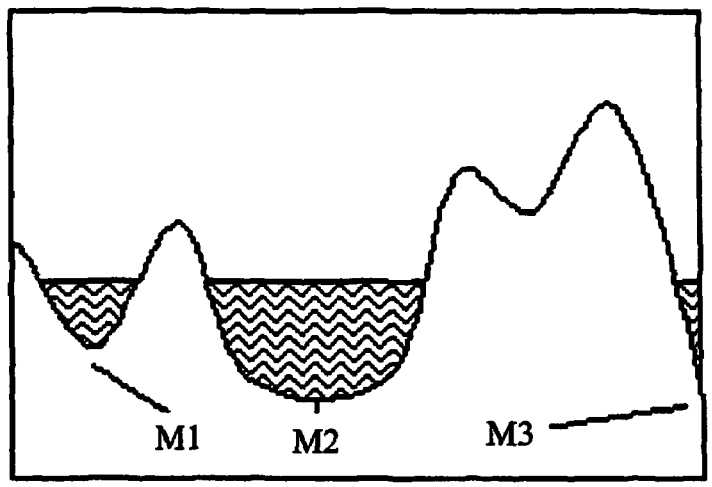
Figure 14:
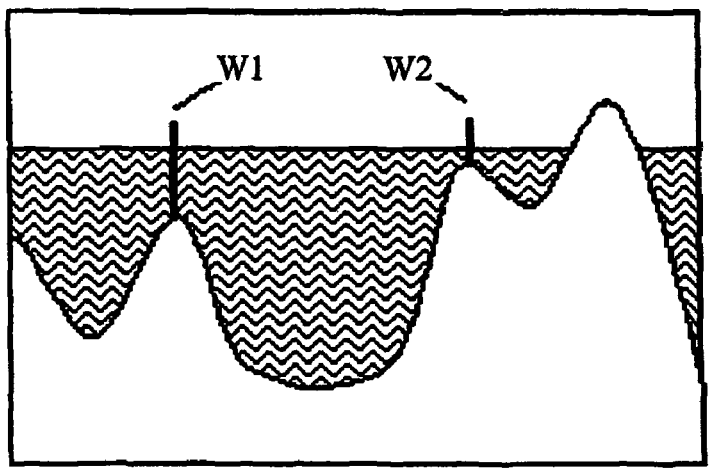
Figure 15:
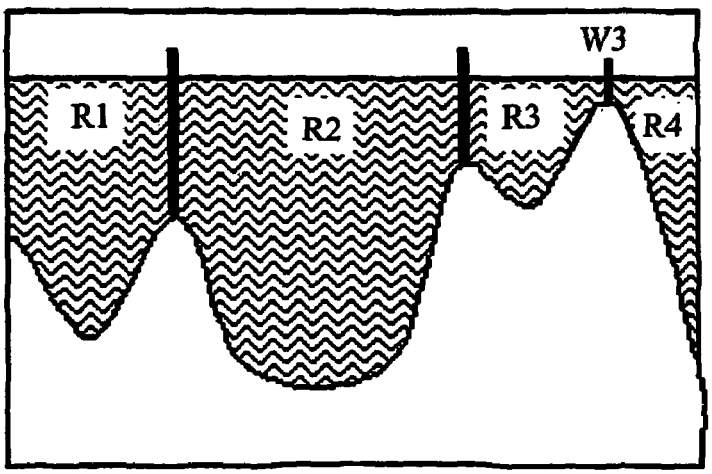

A preferred version of the method in accordance with the invention will be described in detail hereinafter with reference to the Figures. Therein:

FIG. 1 shows a rendering, formed by means of maximum intensity projection, of a computed tomography angiography slice image, FIG. 2 is a view of a sagittal plane of a computed tomography angiography slice image in conformity with FIG. 1, FIG. 3 shows a combination data tree of the slice image of FIG. 2, FIG. 4 shows a rendering, formed by means of maximum intensity projection, of the computed tomography angiography slice image in which the pixels of a first pixel list have been suppressed, FIG. 5 shows a slice image as shown in FIG. 2 in which the pixels of a first pixel list have been suppressed like in FIG. 4, FIG. 6 shows a combination data tree with selection and deselection of the pixel groups in conformity with the FIGS. 4 and 5, FIG. 7 shows a slice image as shown in FIG. 2 in which the pixels have been suppressed in conformity with a second pixel list, FIG. 8 shows a combination data tree with selected and deselected pixel groups in conformity with FIG. 7, FIG. 9 shows a slice image as shown in FIG. 2 in which the pixels have been suppressed in conformity with a third pixel list, FIG. 10 shows a combination data tree in which the pixel groups have been selected and deselected in conformity with the slice image shown in FIG. 9, FIG. 11 shows a slice image as shown in FIG. 2 in which the pixels of a fourth pixel list have been suppressed, FIG. 12 shows a combination data tree in which pixel groups have been selected and deselected in conformity with the slice image shown in FIG. 11, FIG. 13 is a diagrammatic representation of the filter method of the watershed transformation in a first phase, FIG. 14 is a diagrammatic representation of the filter method of the watershed transformation in a second phase, and FIG. 15 is a diagrammatic representation of the filter method of the watershed transformation in a third phase.

FIG. 1 shows a projection of a computed tomography angiography slice image of the abdominal region of a human. The bright and high-contrast structures in the image are the bones, notably the spinal column, the ribs and the pelvis. The aorta, being situated in front of the spinal column in space, is masked by the rendering of the bones. Therefore, the aorta cannot be recognized in the front view of FIG. 1. Merely the kidneys, being situated to the left and the right of the spinal column at the area of the lower ribs, can be recognized as low-contrast shadows with an image value which is slightly higher than the background.

FIG. 2 is a sagittal X-ray slice image of the abdomen of FIG. 1. Therein, the bones appear as white body structures with the same high contrast as is demonstrated notably by the vertebrae BG1 to BG14. Furthermore, the sacrum BG15 and a front part of the pelvic bone BG16 are shown in sectional form.

Being situated in front of the spinal column and having an image value which is slightly smaller than that of the bone structures, the aorta AO can be recognized in the longitudinal sectional view of FIG. 2. The aorta AO is visualized by application of a contrast medium prior to the irradiation performed for the imaging.

As is shown in FIG. 2, the bone structures can be associated with a correspondingly formed combination data tree as shown in FIG. 3. The pixels are then filtered by means of watershed transformation in a first step.

The filter method by means of the watershed transformation will be described with reference to the FIGS. 13 to 15. In these Figures a plurality of pixels, being situated, for example, adjacent one another along a straight line in a rendering, are plotted on the x axis. The amounts of the gradient image values of these pixels are plotted on the y axis, resulting in a cross-section of a topographic rendering of the image values of a two-dimensional image.

According to the watershed transformation the pixels are grouped in an ascending order, starting each time from the pixels whose gradient image value represents a local minimum (M1-M3). The pixels having the gradient image values represented on the ascending curve segments are successively grouped to the relevant minimum of their curve segment. As soon as a pixel of a first group collides with a pixel of a second group, or corresponds thereto, a dam (W1-W3) is erected at this location. These dams (W1-W3) represent the watersheds and are regularly situated at the maxima of the curve. The dams (W1-W3) thus segment the image region into several pixel groups (R1-R4).

Finer or coarser filtering can be realized during this first step by making the maxima at which a dam is erected more or less pronounced.

As a result, the body structures BG1-BG16 which are recognizable in FIG. 2 and highlighted in white and separated from one another are obtained as separate pixel groups. During a second step, these groups are assigned to a respective node of a lower level. For example, the individual vertebra elements and spines BG5-BG14 are assigned to the nodes D1-D10.

During a third step, the vertebra element and spine belonging to a vertebra are logically connected to a respective node of a higher level, for example, like the pixel groups of the vertebra element BG5 and the spine BG6 to a node C5. To this end, the pixel groups formed in the first two steps can be combined in a manner where the smallest distance between the pixel groups is determined and combination takes place if this distance is less than a predetermined value.

The vertebrae associated with the nodes C1-C9 and the sacrum associated with the node C10 are combined so as to form a pixel group in a fourth step which, as before, comprises a combination of the pixels by means of predetermined filter criteria; this pixel group is then assigned to a node B 1. The node B 1, comprising the pixels of all pixel groups assigned to the nodes C1-C10, is logically combined with the nodes C1-C10.

A pixel group BG16 assigned to a node C 11 comprises pixels of the pelvic bone which are situated at a larger distance from the pixel groups of the nodes C1-C10. Therefore, the node C11 is not logically combined with the node B1.

A higher-ranking node A1 is assigned to a pixel group which comprises all pixels of bony body structures of FIG. 1. The node A1 is logically combined with the nodes B1 and C11, because the pixel group assigned to the node A1 comprises all pixels that are also present in the pixel groups of the nodes B1 and C11.

As an alternative for the above method of filtering it may also be advantageous when, starting from a coarse filtering, the few image regions then obtained are subdivided further in subsequent finer filtering steps. In these steps filtering can be performed again by means of watershed transformation which is carried out with filter criteria which are finer than those of the watershed transformation performed in the preceding step.

FIG. 4 is a front view similar to FIG. 1 in which the masking bone structures have been suppressed.

To this end, a secondary image data set was formed on the basis of the sagittal view of FIG. 5; in this secondary image data set the pixels of the bony body structures were taken up in a pixel list and marked by selection of the node A1. The marked pixels are shown in black in FIG. 5. When a front view in which the marked pixels have been suppressed is formed from the filtered secondary image data set thus obtained, as is shown in FIG. 4 the masking of the aorta by bone structures can be avoided so that the vascular system can be observed.

The selection of the node A1 is indicated in FIG. 6 by blackening the node.

The pixels of an individual vertebra BG7, BG8 can be deselected and removed from the pixel list by deselection of the node C6 as is shown in FIG. 8. The pixel elements thus removed are not marked in the secondary image data set. Upon formation of a sagittal view, the correspondingly deselected individual vertebra is then rendered as shown in FIG. 7; it can then serve, for example, as a reference point for the evaluation of the anatomic overall structure. The deselection of the node C6 is indicated by whitening the node in FIG. 8.

Similarly, as is shown in FIG. 10, all bone structures with the exception of a single vertebra BG6, BG7 and the sacrum BG16, can be marked by selection of the node A1 and deselection of the nodes C6 and C11, so that an image as shown in FIG. 9 is obtained by the formation of a sagittal view.

Finally, as is shown in FIG. 12, by selection of the node A1 and the nodes D2, D4, D6, D8 and D10 and deselection of the node B1 exclusively the individual spines BG6, BG8, BG10, BG12 and BG14 and the pelvic bone BG16 can be marked in the secondary image data set and separately represented in a rendering formed from the secondary image data set as is shown in FIG. 11.

The invention claimed is:

1. A method for the formation of a selective rendering of body structures of an object to be examined from a primary image data set that is executed on a computer, the computer including computer memory that stores instructions that when executed on the computer, cause the computer to perform the steps of:

forming at least one pixel group (BG1-BG16) which comprises pixels from the primary image data set which are in conformity with predetermined filter criteria;

forming at least one pixel list by selection and/or deselection of at least one pixel group in conformity with predetermined criteria;

marking the pixels of the pixels groups of the at least one pixel list;

forming a filtered secondary image data set which includes the marked pixels; and forming the rendering from the secondary image data set, the marked pixels being rendered separately in highlighted or suppressed form;

wherein a plurality of pixel groups is defined, wherein a combination data tree is formed by assigning each pixel group (BG1-BG16) to a node (D1-D10, C1-C11, B1, B2, A1), and that the nodes are logically assigned to one another in conformity with a predetermined combination criterion and the selection and deselection are performed by selection and/or deselection of the nodes.

2. The method as claimed in claim 1, in which a plurality of image regions is defined, wherein the pixels overlap at least partly.

3. The method as claimed in claim 1, wherein the logic combination of two nodes takes place if all pixels of the pixel group associated with one node are also contained in the pixel group associated with the other node and if the pixel groups associated with the two nodes are not situated more than a predetermined distance apart.

4. The method as claimed in claim 1, wherein the logic combination is performed by mutual combination of pixel groups in the form of a hierarchically structured combination tree, wherein:

each pixel group is assigned a node of a lower level (C1-C11);

at least one higher level (B1, B2) is defined;

nodes of a respective lower level are combined with a node of a hierarchically higher level if all pixels of the pixel group associated with the lower node are also contained in the pixel group associated with the node of the higher level, and if the pixel groups associated with the nodes of the lower level are not situated more than a predetermined distance apart.

5. The method as claimed in claim 4, wherein the formation of the filtered secondary image data set is performed by selection and deselection of nodes of different levels.

6. The method as claimed in claim 1, wherein the forming of the at least one pixel group is performed by means of the watershed transformation which comprises the following steps: forming a gradient image data set in which each pixel is assigned a gradient image value which corresponds to the difference between the image value of this pixel in the primary image data set and the image value of the pixels surrounding this pixel; and defining the pixel group by defining a gradient image region of neighboring pixels which are separated from one another by a local maximum of the gradient image values.

7. The method as claimed in claim 1, wherein each of the at least one pixel group (BG1-BG16) has a different corresponding predetermined filter criteria.

8. The method as claimed in claim 1, wherein the pixels in the secondary image data set are marked by setting an associated image value to a predetermined, uniform image value.

9. The method as claimed in claim 8, wherein the predetermined, uniform image value is 0.

10. The method as claimed in claim 1, wherein the pixels are marked by reducing the associated image value by a predetermined absolute or relative amount.

11. The method as claimed in claim 1, wherein the pixels contained in the pixel list are marked in such a manner that the pixels are highlighted or diminished in color in the subsequent rendering.

12. The method as claimed in claim 1, wherein selection is the inclusion of a pixel group in a previously made selection.

13. The method as claimed in claim 1, wherein deselection is the removal of a pixel group in a previously made selection.

14. The method of claim 1, wherein the pixel list is an enumeration list which contains a reference to the selected and deselected pixels groups.

15. The method of claim 1, wherein the pixel list is an enumeration list which comprises all pixels selected by selection and deselection and a reference to the corresponding pixels.

16. The method of claim 1, wherein the pixel list is an enumeration list which comprises all pixels selected by selection and deselection and the image values and coordinates of the corresponding pixels.

17. A method for the formation of a selective rendering of body structures of an object to be examined from a primary image data set that is executed on a computer, the computer including computer memory that stores instructions that when executed on the computer, cause the computer to perform the steps of:

forming at least one pixel group (BG1-BG16) which comprises pixels from the primary image data set which are in conformity with predetermined filter criteria;

forming at least one pixel list by selection and/or deselection of at least one pixel group in conformity with predetermined criteria;

marking the pixels of the pixels groups of the at least one pixel list;

forming a filtered secondary image data set in which includes the marked pixels; and forming the rendering from the secondary image data set, the marked pixels being rendered separately in highlighted or suppressed form, wherein a plurality of image regions is defined, wherein the pixels overlap at least partly; and wherein there is formed a plurality of hierarchically structured combination data trees whose nodes are logically combined in conformity with at least one combination criterion if all pixels of the pixel group associated with the lower node are also contained in the pixel group associated with the node of the higher level; and if the pixel groups associated with the two nodes are not situated more than a predetermined distance apart, that the combination criteria of the combination trees differ in respect of at least one combination criterion;

wherein the formation of the pixel list takes place by selection and deselection of nodes of at least one level in the combination trees.

18. A device having a computer with computer memory, the computer memory storing instructions that when executed on the computer, cause the computer to perform a method for the formation of a selective rendering of body structures from a primary image data set, said method comprising the steps of:

forming at least one pixel group which contains pixels from the primary image data set which are in conformity with predetermined filter criteria;

forming at least one pixel list by selection and deselection of at least one pixel group in conformity with predetermined criteria;

marking the pixels of the pixels groups of the at least one pixel list;

forming a filtered secondary image data set which includes the marked pixels; and forming the rendering from the secondary image data set, the marked pixels being rendered separately in highlighted or suppressed form;

wherein a plurality of image regions is defined, wherein the pixels overlap at least partly; and wherein there is formed a plurality of hierarchically structured combination data trees whose nodes are logically combined in conformity with at least one combination criterion if all pixels of the pixel group associated with the lower node are also contained in the pixel group associated with the node of the higher level; and if the pixel groups associated with the two nodes are not situated more than a predetermined distance apart, that the combination criteria of the combination trees differ in respect of at least one combination criterion;

wherein the formation of the pixel list takes place by selection and deselection of nodes of at least one level in the combination trees.

* * * * *